US012545013B2

(12) United States Patent
Baert et al.

(10) Patent No.: US 12,545,013 B2
(45) Date of Patent: *Feb. 10, 2026

(54) FLOORING PANEL (71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 69 days.

This patent is subject to a terminal disclaimer.

(21) Appl. No.: 18/060,109

(22) Filed: Nov. 30, 2022

(65) Prior Publication Data
US 2023/0102628 A1 Mar. 30, 2023

Related U.S. Application Data (63) Continuation-in-part of application No. 17/804,425, filed on May 27, 2022, now Pat. No. 12,103,275, and
(Continued)

(30) Foreign Application Priority Data

Apr. 30, 2021 (NL) .................................. 2028108

(51) Int. Cl.
*E04B 2/00* (2006.01)
*B32B 3/06* (2006.01)
(Continued)

(52) U.S. Cl.
CPC .............. *B32B 27/065* (2013.01); *B32B 3/06* (2013.01); *B32B 3/30* (2013.01); *B32B 5/18* (2013.01);
(Continued)

(58) Field of Classification Search
CPC ............. B32B 3/06; B32B 3/30; E04F 15/107
See application file for complete search history.

(56) References Cited

U.S. PATENT DOCUMENTS

| 3,421,597 A | 1/1969 | Blau et al. |
|---|---|---|
| 3,887,737 A | 6/1975 | Baxter |

(Continued)

FOREIGN PATENT DOCUMENTS

| CN | 103862775 A | 6/2014 |
|---|---|---|
| CN | 210947556 U | 7/2020 |

(Continued)

OTHER PUBLICATIONS

Thomas Luc Martine Baert et al.; Flooring Panel; U.S. Appl. No. 17/380,581, filed Jul. 20, 2021.
(Continued)

*Primary Examiner* — Basil S Katcheves
(74) *Attorney, Agent, or Firm* — Heslin Rothenberg Farley & Mesiti P.C.

(57) ABSTRACT

The invention relates to a flooring panel suitable for constructing a floor covering, which panel comprises a core layer and a decorative top layer and a layer situated between the core layer and the decorative top layer which enables improves sound performance.

20 Claims, 4 Drawing Sheets

Related U.S. Application Data a continuation-in-part of application No. 17/380,581, filed on Jul. 20, 2021, now Pat. No. 12,011,905, said application No. 17/804,425 is a continuation of application No. 17/380,581, filed on Jul. 20, 2021, now Pat. No. 12,011,905.

(51) Int. Cl.

| | | |
|---|---|---|
| *B32B 3/30* | (2006.01) | |
| *B32B 5/18* | (2006.01) | |
| *B32B 7/022* | (2019.01) | |
| *B32B 27/06* | (2006.01) | |
| *B32B 27/20* | (2006.01) | |
| *B32B 27/22* | (2006.01) | |
| *E04F 15/02* | (2006.01) | |
| *E04F 15/10* | (2006.01) | |

(52) U.S. Cl.
CPC .............. *B32B 7/022* (2019.01); *B32B 27/20* (2013.01); *B32B 27/22* (2013.01); *E04F 15/02038* (2013.01); *E04F 15/107* (2013.01); *B32B 2266/06* (2013.01); *B32B 2266/08* (2013.01); *B32B 2307/102* (2013.01); *B32B 2307/536* (2013.01); *B32B 2419/04* (2013.01); *E04F 2201/0153* (2013.01); *E04F 2201/023* (2013.01); *E04F 2201/043* (2013.01)

(56) References Cited

U.S. PATENT DOCUMENTS

| | | | |
|---|---|---|---|
| 3,995,087 A | 11/1976 | Desanzo | |
| 4,002,792 A | 1/1977 | Petersen | |
| 4,013,810 A | 3/1977 | Long | |
| 6,586,080 B1 | 7/2003 | Heifetz | |
| 9,631,361 B2 | 4/2017 | Clausi | |
| 9,745,758 B2* | 8/2017 | Baert | E04F 15/105 |
| 10,494,822 B2 | 12/2019 | Song | |
| 10,619,358 B2 | 4/2020 | Segaert | |
| 11,946,251 B2 | 4/2024 | Baert | |
| 12,011,905 B2* | 6/2024 | Baert | B32B 7/022 |
| 2007/0144093 A1* | 6/2007 | Messenger | E02D 27/02 |
| | | | 52/309.12 |
| 2010/0092731 A1* | 4/2010 | Pervan | B32B 27/04 |
| | | | 118/200 |
| 2010/0297434 A1* | 11/2010 | Iversen | E04F 15/10 |
| | | | 977/773 |
| 2010/0319282 A1* | 12/2010 | Ruland | E04F 15/10 |
| | | | 52/309.3 |
| 2011/0014414 A1* | 1/2011 | Senior | B32B 21/14 |
| | | | 428/106 |
| 2012/0276348 A1* | 11/2012 | Clausi | B32B 29/002 |
| | | | 428/524 |
| 2014/0170359 A1 | 6/2014 | Schwitte et al. | |
| 2016/0114495 A1* | 4/2016 | Pervan | B32B 37/1027 |
| | | | 427/201 |
| 2016/0208500 A1* | 7/2016 | Chagas | B32B 9/02 |
| 2019/0017278 A1* | 1/2019 | De Rick | E04F 15/105 |
| 2020/0030846 A1* | 1/2020 | Clausi | B27N 7/005 |
| 2020/0101710 A1 | 4/2020 | Clausi | |
| 2020/0284050 A1 | 9/2020 | Troendle | |
| 2024/0300220 A1 | 9/2024 | Baert et al. | |
| 2025/0001738 A1 | 1/2025 | Baert et al. | |

FOREIGN PATENT DOCUMENTS

| | | |
|---|---|---|
| CN | 112534016 A | 3/2021 |
| NO | 2010088769 A1 | 8/2010 |
| WO | 9917930 | 4/1999 |
| WO | 2020009973 A1 | 1/2020 |
| WO | 2021180882 A1 | 9/2021 |

OTHER PUBLICATIONS

Thomas Luc Martine Baert et al.; Flooring Panel; U.S. Appl. No. 17/804,425, filed May 27, 2022.

* cited by examiner

FLOORING PANEL

CROSS REFERENCE TO RELATED APPLICATIONS

This is a Continuation in Part of pending U.S. application Ser. No. 17/380,581, filed on Jul. 20, 2021, and a Continuation in Part of pending U.S. application Ser. No. 17/804,425, filed on May 27, 2022, which is a Continuation of U.S. application Ser. No. 17/380,581, filed on Jul. 20, 2021, all of which claim priority under 35 U.S.C. § 119 to Netherland Patent Application No. NL2028108, filed on Apr. 30, 2021. The contents of each of these prior applications are hereby incorporated herein by reference in their entirety.

FIELD OF THE INVENTION

The invention relates to a flooring panel suitable for constructing a hard surface floor covering.

BACKGROUND

Sound or noise is a key design consideration in modern residential, commercial and industrial architecture. Noise in a building without proper sound management is transmitted between rooms, while surfaces within a room reflect, absorb or even enhance noise. This noise can disturb workers or residents and lead to adverse health effects such as sleeping disorders, stress, and headaches. Noise is generally understood to include two types: airborne sound (such as from speech or television) and impact sound (such as from footfall or an object falling on the floor). Traditionally, sound management solutions designed to improve the sound performance of a building include acoustic ceilings, wall treatments, and even acoustic flooring, which focus on reducing the amplitude (strength) of the noise transmitted to adjoining rooms or scattering sound waves to reduce reflection.

Hard surface floor coverings are popular due to their rigidity and strength. However, hard surface floor coverings are also known for their relatively poor acoustic performance and are therefore generally not suited for use as an acoustical floor covering specifically due to the hardness of the top surface. This is further exacerbated by the rigidity required to serve as a floating floor (generally defined as >3500 Mpa when tested according to EN 310), that is a floor with an interlocking mechanism which can be installed abutted without adhesive, to provide sufficient strength to the panel to feature an interlocking mechanism and to bridge subfloor imperfections. Faced with these disadvantages, it is known to attempt to improve, and thus reduce, the amplitude of transmitted sound of at least certain frequencies of hard surface floor coverings, by providing an underlay between the decorative flooring and the subfloor, or to adhere an acoustic pad to the back surface of the decorative flooring in the factory. This type of underlay provides a low density, porous buffer layer which, by means of friction between the air particles and its pore walls, reduces the amplitude of certain frequencies of the sound waves passing through the flooring. The sole purpose of this buffer layer is to absorb some of the acoustic energy passing through the floor panel. There is no technical solution as of yet to improve the reflected walking sound of hard surface floor coverings.

The disadvantages of the existing technologies for improving sound performance of flooring coverings are three-fold. First, the achieved sound attenuation of the generated impact sound is limited to the thickness of the floor coverings, generally ranging from 3 to 15 mm thickness, which limits the optimal range of thickness of the buffer layer and pore sizes for optimal sound diffusion. Second, "hard surface" floor coverings, feature by definition a surface with a relatively high hardness of more than 46 Shore D. Third, these panels feature a rigidity of more than 3500 Mpa to allow for a floating installation. The combination of these features results in especially disturbing high-pitch noise and greatly limits the possibility to attenuate the transmission of impact sound and reflected walking sound.

There is therefore need for a (hard, rigid) surface floor covering which solves at least one of the disadvantages of the current art or which provides at least an alternative.

The invention provides thereto a flooring panel, in particular a (hard) surface flooring panel, suitable for constructing a (hard) floor covering, comprising at least one core layer, at least one decorative top layer and at least one compressible layer situated between the core layer and the decorative top layer, wherein the decorative top layer comprises at least one veneer and wherein the compressible layer comprises at least one compressible natural material.

The panel according to the present invention has several benefits over the prior art. The combination of the use of a decorative top layer comprising at least one veneer and a compressible layer comprises at least one compressible natural material and which is situated between the core layer and the decorative top layer which compressible layer, results in a significant reduction of generated sound. It was further found that a reduction in reflected sound and/or transmitted impact sound can be obtained. It was experimentally found through extensive testing by the inventors of the present invention that the best sound attenuating performance is not achieved through reduction of the transmitted sound, but through reduction of the sound generated in particular when the floor surface is excited by an impact. Through absorption and transformation of the impact's kinetic energy, a significant reduction in the generated sound's amplitude and pitch can be achieved.

At least one compressible natural material is preferably chosen from the group of: felt, cotton, wool, mycelium, hemp and/or cork. A combination of several compressible natural materials can be applied too. It is also conceivable that the compressible layer comprises at least one natural material, and possibly multiple natural materials wherein at least one natural material may have compressible characteristics. The compressible layer may also comprise a material chosen from the group of: a closed cell flexible foam, a compressible foam, a flexible polymer, an elastomer, a compressible natural material, and/or a combination of any of the above. It is conceivable that the compressible layer comprises at least 50% of a foam material, in particular a closed cell foam material. Possibly, the compressible layer comprises at least 80% closed cell foam material. A closed cell foam material enables sufficient compressible behaviour whilst being sufficiently strong to support the decorative top layer and a load when applied. The compressible layer could for example be made of a closed cell flexible foam. The compressible layer may also comprise a semi-closed or open cell compressible foam. An open cell construction has the benefit of improved acoustical absorption. The compressible layer may for example comprise polyolefin foam, expanded polystyrene, expanded polypropylene, expanded rubber, expanded ethyl vinyl acetate, expanded vinyl and/or expanded polyethylene. It is also possible that the compressible middle layer is a substantially solid layer that is not foamed. In this case best results are obtained with materials chosen from the groups of flexible polymers and elastomers such as: rubber, latex, acrylic elastic epoxy, cis-polyisoprene (natural rubber, NR), cis-polybutadiene (butadiene rubber, BR), nitrile butadiene rubber (NBR), styrene-butadiene rubber (SBR), rubber, latex and/or ethylene-propylene monomer (EPM). It is possible that the compressible layer is a combination of any of the above foamed and/or not-foamed materials. These examples are non-limiting and any similar materials having equivalent material properties could be applied. The compressible layer typically has a thickness in the range 0.8 to 4 mm, in particular in the range of 0.8 to 2 mm. In a further preferred embodiment, the compressible layer has a thickness in the range of 0.75 to 1.25, in particular in an uncompressed state.

The decorative top layer preferably comprises at least one veneer chosen from the group of: a wood veneer, a bamboo veneer, a tile veneer, a stone veneer and/or a clay veneer. It also possible that the decorative top layer comprises multiple veneers. It is for example possible that the decorative top layer comprises a laminate of veneers, for example wood veneers.

In a preferred embodiment, the panel comprises a decorative top layer comprising at least one wood veneer in combination with a compressible layer which comprises cork. The thickness of the decorative top layer is preferably at least equal to the thickness of the compressible layer. However, it is also conceivable that the thickness of the decorative layer is larger than the thickness of the compressible layer.

In a further preferred embodiment, the decorative top layer has a flexibility of 1800 MPa or less and/or wherein the compressible layer has a Shore A hardness of 75 or less. The decorative top layer having a flexibility of 1800 MPa or less can be classified as a relatively flexible top layer. The compressible layer having a Shore A hardness of 75 or less is typically configured to be temporarily deformed, and in particular compressed. It was experimentally found that the combination of a relatively hard and/or flexible decorative top layer and a compressible layer according to the present invention has an unexpected positive effect on the sound attenuation due to the generated sound being diminished. A result of 26 dB attenuation was found for the combination of the decorative top layer and the compressible layer according to present invention. This result could even be obtained which significantly thinner constructions compared to prior art floor configurations which feature a rigid top layer, or flexible floor coverings which feature no compressible layer situated between the core layer and the top layer. The combination of a decorative top layer and a compressible layer, wherein the decorative top layer has a flexibility of 1800 MPa or less and/or wherein the compressible layer has a Shore A hardness of 75 or less is not a straight forward solution for the skilled person since the state of the art merely focuses on attenuating the generated sound rather than diminishing the generated sound.

The flexibility of a flooring layer, for example the decorative top layer, the compressible layer and/or the core layer is typically measured according to EN 310 or ASTM D790. The flexibility measured according to said standards measures the ability of a material to withstand deformation as a whole when a perpendicular force is applied to its surface. The hardness of the panel layer can further be measured with a durometer. In this method a higher number corresponds to a higher hardness. The hardness is an indication of the ability of the tested material to deform locally at a point of pressure when a perpendicular force is applied to its surface. Shore A is generally used for softer materials using a needle with a blunted point; while Shore D is used for medium hard to hard surface measurements using a needle that ends with a 30°, sharp point angle. In general, a Shore A classification can be made from very soft (0-40), soft (40-75), and medium hard (75-95); a shore D classification can be made from soft (8-25), medium hard (25-46) and hard (46-90). There is a certain overlap between the two scales, with a (soft) Shore A of 40-75 being similar in hardness to a Shore D of 8-25; and a (medium hard) Shore A of 75-95 being similar in hardness to a Shore D of 25-46. Per illustration, the hardness of a laminate panel featuring a high-density fibreboard core and a melamine impregnated top layer is in the range of 80-90 Shore D; the hardness of a rigid vinyl is in the range of 70-90 Shore D; the hardness of a traditional gluedown LVT is around 50-55 Shore D; and the hardness of a ceramic tile is 80-90 Shore D. As impact noise is generated by the striking of a hard object (shoe heel, a chair, a smartphone, etc.) on a hard surface, it follows that the harder the surface, the higher the amplitude and pitch of the noise generated, and conversely, the softer the surface or object, the lower the amplitude and pitch of the noise generated. When hard surface floor coverings are excited by footfall or above above-mentioned measuring equipment such as a tapping machine, the resulting generated sound is of a high pitch and large amplitude, which is illustrated above to be specifically disturbing to human perception.

In a preferred embodiment of the panel, the compressible layer has a Shore A hardness of 75 or less. This means that the compressible layer having a Shore A hardness of 75 or less allows relatively easy deformation of said layer. In a further preferred embodiment, the compressible layer has a Shore A hardness of 65 or less, and more preferably of 55 or less. The Shore A hardness of the compressible layer may for example be in the range of 45 to 65. In an advantageous embodiment, the Shore A hardness of the compressible layer is at most 55.

The compressive strength of the compressible layer can also be measured according to EN 826. The compressive strength is an indication of the ability of a material to deform locally at a point of pressure when a perpendicular force is applied to its surface. A shore A hardness of 75 is according to this test method roughly equivalent to 445 psi or 3 Mpa. Preferably, the compressible layer has a compressive strength of 400 kPa or less, and more preferably of 200 kPa or less. A compressible layer having a compressive strength of 200 kPa or less allows deformation and is able to revert to its original state relatively quickly after being subjected to stress. It is also conceivable that the compressible layer has a compressible strength of at most 3 MPa. The use of such compressible layer can further contribute to the absorption and/or transformation of the impact's kinetic energy wherefor a significant reduction in the generated sound's amplitude and pitch can be achieved. It was experimentally found that good results were achieved when applying such compressible layer.

The compressible layer preferably has an acoustic impedance of at most 8, more preferably at most 5 and even more preferably at most 2 MRayl. Preferably the acoustic impedance of the compressible layer is lower than the acoustic impedance of the decorative top layer. Possibly, the acoustic impedance of the compressible layer is at least less than half, preferably less than one quarter of the impedance of the decorative top layer. Preferably the acoustic impedance of the compressible layer is lower than the acoustic impedance of the decorative top layer. Possibly, the acoustic impedance of the compressible layer is at least less than half, preferably less than one quarter of the impedance of the decorative top layer. Possibly, the acoustic impedance of the compressible layer is at least less than half, preferably less than one quarter of the impedance of the core.

It is also imaginable that the compressible layer comprises at least one intermediate acoustic impedance layer, preferably wherein said intermediate acoustic impedance layer has an acoustic impedance of at least 4, preferably at least 7 and more preferably at least 10 Mrayl. It is also conceivable that the intermediate acoustic impedance layer has an acoustic impedance of at most 8, preferably at most 5 and more preferably at most 2 MRayl. The intermediate acoustic impedance layer has a thickness in the range of 0.05 to 2 mm, preferably in the range of 0.1 to 0.7 mm, if applied. In a preferred embodiment, the intermediate acoustic impedance layer comprises at least one additive, preferably having an acoustic impedance higher than 30 MRayl. The use of such additive may have a further positive influence on the acoustic performance of the panel as such. The compressible layer could comprise at least one additive chosen from the group of: iron, silicon carbide and/or alumina. It is also possible that the additive comprises iron, silicon carbide and/or alumina. Said additives are relatively heavy which prevents them from vibrating within the material. The additive(s) may be dispersed in at least part of the intermediate acoustic impedance layer.

The thickness of the decorative top layer could be in the range of 0.5 to 3 times the thickness of the compressible layer. In a preferred embodiment, the thickness of the decorative top layer is at least equal to the thickness of the compressible layer. The compressible layer and decorative top layer are preferably configured such that it is enables that the decorative top layer can deform into the compressible layer. It is for example conceivable that at least one veneer has a thickness in the range of 0.8 to 2 mm.

In a preferred embodiment, the decorative top layer has a flexibility of 1500 MPa or less, preferably 1200 MPa or less and more preferably 900 MPa or less. Preferably, the decorative top layer has a flexibility of at least 300 MPa. The decorative top layer could for example have a flexibility in the range of 300 to 900 MPa. It was experimentally found that decorative top layers having said flexibility values provide good sound attenuating results.

Preferably, the upper surface of decorative top layer has a Shore D hardness of at least 46. The upper surface of decorative top layer can for example have a Shore D hardness in the range of 46-90, in the range of 46 to 60 or in the range of 61 to 90. The upper surface of decorative top layer can also have a Shore D hardness of 50 to 80, preferably of about 60 to 70. It was experimentally found that decorative top layers with the desired flexibility and a Shore D hardness of about 60 to 70 feature all the benefits of hard surface floor coverings, including scratch resistance, ease of cleaning, indentation resistance, and also feature a greatly improved sound performance, and providing sufficient hardness to withstand heavy traffic.

It is preferred that the decorative top layer comprises at least one polymer material. The decorative top layer could for example be at least partially made of polyvinyl chloride (PVC), polyurethane (PU), polypropylene (PP), Polyethylene terephthalate (PET), chlorinated polyethylene (CPE), polyethylene (PE), chlorinated PVC (CPVC), Acrylonitrile butadiene styrene (ABS), polycarbonate (PC), and the like. Preferably the top layer comprises a flexible PVC, flexible PET or flexible PP compound. Preferably the top layer comprises flexible PVC. The density of the PVC could for example be in the range of 1.1 to 1.35 g/cm³. Preferably, the decorative top layer also comprises at least one mineral filler. Non-limiting examples of mineral fillers to be used are talc, calcium carbonate (CaCO3) and/or perlite. The decorative top layer could for example comprise up to 15 wt. % and preferably up to 10 wt. % of fillers.

Preferably, the decorative top layer comprises at least one plasticizer, such as but not limited to external or internal plasticizers, including orthophthalate plasticizers such as DEHP, DOP, DIDP, DTDP, non-OTP plasticizers such as DOTP, DINCH, bioplasticizers such as soybean oil, copolymers such as ASA, ABS, MBS, Chlorinated Polyethylene (CPE), acrylates (ACR), or an elastomer chosen from the groups of polyolefin elastomers, copolymers of ethylene-butene or ethylene-octene, Nitrile-butadiene rubbers (NBR), and the like. It is conceivable that the decorative top layer comprises at least one internal plasticizer and/or at least one external plasticizer. The application of at least one plasticizer could positively contribute to the softness and/or flexibility of the decorative top layer, which improves the acoustic dampening effect of the panel according to the present invention. The decorative top layer can further comprise further additives such as but not limited to flame retardants (ATH, MDH etc); stabilizers (ex. metal soaps such as zinc stearate, calcium-zinc stearate, calcium stearate, etc); UV inhibitors, biocides such as antimicrobial, antiviral (si-quat), antibacterial, and antifungus agents, processing agents and lubricants such as solid or liquid fatty esters, fatty alcohols, fatty acid esters, ester wax, solid hydrocarbons such as paraffin wax or polyethylene wax; Titanium Dioxide and similar whitening agents, foaming agents and/or foaming regulators, etc.

In a preferred embodiment, the decorative top layer comprises at least one decor layer and/or at least one wear layer. The wear layer could for example be scratch resistant layer. The decorative top layer could possibly comprise a wear layer or finishing layer, for example with a thermosetting varnish or lacquer such as polyurethane, PUR, or a melamine based resin. In a preferred embodiment, the top layer comprises at least one substantially transparent wear layer or finishing layer. The wear layer may comprise one or more transparent layers of a thermoplastic or thermosetting resin. Non-limiting examples of thermoplastic or thermosetting materials which could be used are polyvinyl chloride (PVC), polystyrene (PS), polyethylene (PE), polyurethane (PU), acrylonitrile butadiene styrene (ABS), polypropylene (PP), Polyethylene terephthalate (PET), phenolic and/or melamine or formaldehyde resins. Said wear layer may also be in a liquid or paste-like form made of a thermosetting resin such as but not limited to phenolic and/or melamine or formaldehyde resins. The wear layer may comprise or may be substantially composed of an inherently scratch-resistant thermosetting resin impregnating a carrier layer such as paper or lignocellulose. An advantage of this latter embodiment is that the urea-formaldehyde also acts a relatively scratch-resistant wear layer. Typically, a preferred thickness of the wear layer structure in the panel of the invention is in the range of 0.1 to 2.0 mm, more preferably between 0.15 mm to 1 mm and most preferably between 0.2 mm to 0.8 mm.

In a preferred embodiment, the wear layer or finishing layer can comprise at least one coating layer. For example, the at least one coating layer may comprise a protective coating layer that is at least partially transparent or translucent. In a preferred embodiment, the at least one coating layer can for example be a polyurethane coating, an acrylic coating, and/or an epoxy polyol coating. Such coating can for example be an ultraviolet (UV) or electron beam (EB) curable coating. It is further conceivable that the coating layer comprises a thermoset resin and a photoinitiator crosslinked by a UV or electron beam curing process.

In one possible embodiment, the decor layer is basically composed of a carrier material layer designed to be provided with a decorative pattern at the upper side. A suitable material is a woven, extruded or calendered plastic net, sheet or film. Non-limiting examples of thermoplastic or thermosetting materials which could be used are polyvinyl chloride (PVC), polystyrene (PS), polyethylene (PE), polyurethane (PU), acrylonitrile butadiene styrene (ABS), polypropylene (PP), phenolic and/or melamine or formaldehyde resins.

Alternatively, the decor layer may comprise at least one cellulose based layer and possibly a cured resin, wherein the cellulose based layer is preferably paper, a wood veneer, a bamboo veneer, and the like. Such a decor layer can comprise a multitude of such plies of resin impregnated paper or wood veneers. The décor layer may further comprise a veneer of stone or cured clay, or a porcelain or ceramic tile. Alternatively the décor layer may comprise a bottom primer or coat which is applied in liquid or semi-liquid state and then cured, prior to receiving at least one decorative visual in form of ink provided in dots to form as a whole the desired visual effect. Such ink can consist of at least 3 colors based on standard color schemes and is applied in a quantity 0.1-50 pl per dot. For flooring purposes, a preferable color scheme can be applied in a resolution of at least 350 dpi, more preferably at least 400 dpi.

The decorative top layer typically has a thickness in the range of 0.5 to 2.5 mm, preferably in the range of 0.8 to 2 mm. Typically, the thickness of the decorative top layer is smaller than 3.5 mm, preferably smaller than 3 mm, more preferably smaller than 2.75 mm. It is beneficial to apply a relatively thin decorative top layer. This will positively contribute to the flexibility of the decorative top layer and thus for the sound attenuating performance of the panel.

Possibly, the panel comprises at least one reinforcing layer, positioned between the decorative top layer and the compressible layer. The reinforcing layer is preferably configured to improve properties of the decorative top layer without negatively affecting its flexibility. It is conceivable that at least one reinforcing layer forms integral part of the decorative top layer. The reinforcing layer could for example be embedded in the decorative top layer. The reinforcing layer could for example comprise fiberglass.

In a preferred embodiment, the decorative top layer comprises at least one additive having an acoustic impedance higher than 30 MRayl. It is also conceivable that least one layer comprised in the decorative top layer comprises at least one additive having an acoustic impedance higher than 30 MRayl. The use of such additive may have a further positive influence on the acoustic performance of the panel as such. The decorative top layer could comprise at least one additive chosen from the group of: iron, silicon carbide and/or alumina. It is also possible that the additive comprises iron, silicon carbide and/or alumina. Said additives are relatively heavy which prevents them from vibrating within the material. The additive(s) may be embedded in at least part of the decorative top layer. The decorative top layer typically has an acoustic impedance of at least 4, preferably at least 7 and more preferably at least 10 Mrayl.

In yet a further embodiment, the decorative top layer comprises at least one upper acoustic impedance layer having an acoustic impedance of at least 4, preferably at least 7 and more preferably at least 10 Mrayl. The upper acoustic impedance layer may have a thickness in the range of 0.05 to 2 mm, preferably in the range of 0.1 to 0.7 mm. The upper acoustic impedance layer can for example be directly attached to an upper side of the compressible layer. It is also conceivable that the upper acoustic impedance layer is enclosed between further laminate layers of the decorative top layer. The upper acoustic impedance layer may impart at least some support and/or flexibility to the decorative top layer. It is conceivable that the upper acoustic impedance layer is directly or indirectly connected to further upward-facing decorative and/or protective elements, such as a decorative film, a vinyl veneer, an LVT, at least one ply of a cellulose-based layer and a cured resin, a wood veneer, a bamboo veneer, a tile veneer, a stone veneer, a clay veneer, and the like, thereby imparting the required flexibility and support to the top layer to achieve enhanced acoustic properties. It is conceivable that any of the layers comprised in the decorative top layer functions as a high impedance layer. The high impedance layer therefore can be understood as any part of the decorative top layer comprising at least 0.5 wt. %, preferably at least 1 wt. %, more preferably at least than 5 wt. % of high-impedance materials, in particular in order to increase its impedance. It is also conceivable that the high impedance layer makes part of a layer comprised in the decorative top layer. It is possible that the decorative top layer comprising at most 15 wt. %, preferably at most 10 wt. %, more preferably at most 5 wt. % of high-impedance materials Furthermore, it is noted that the combination of an upper acoustic impedance layer according to the present invention with a compressible layer further improves the acoustic performance of the construction. It is theorized by the inventors that, when subjected to the same kinetic energy, a high impedance layer, such as an upper acoustic impedance layer, at the surface of the panel is not able to vibrate and therefore generate sound as efficiently or easily as a low impedance layer. This also applied for the decorative top layer acting as high impedance layer. A reduction of up to 26 dB amplitude was achieved at a 100-4000 Hz frequency band, whereas the generated average pitch was reduced by up to 5 octaves, by combining (into a laminate), from top to bottom: a 0.5 mm PVC decorative layer of 1800 Mpa rigidity and Shore D hardness of 65; a 0.5 mm iron particle particle-filled CPE composite foil of 1800 Mpa rigidity and 8 Mrayl impedance, and a 1 mm IXPP compressible layer with a shore A hardness of 55.

It is also conceivable that, in case applied, the boundary surface between the at least one intermediate acoustic impedance layer incorporated in the compressible layer and the at least one upper acoustic impedance layer incorporated in the decorative top layer form a first reflective boundary in the structure of the floor panel. It is conceivable that the ratio between the acoustic impedances of the two (panel) layers forming the first reflective boundary is greater than 2:1, most preferably greater than 4:1. The greater the difference between acoustic impedances of the two materials at the first reflective boundary, the greater the reduction of transmitted sound. It is conceivable that the ratio between the acoustic impedances of the two materials at the boundary is more than 10:1.

It is possible that the compressible layer and the decorative top layer form a first reflective boundary. In case applied, it is also possible that the compressible layer and the at least one upper acoustic impedance layer incorporated in the decorative top layer form a first reflective boundary. In case an intermediate acoustic impedance layer is applied, it is possible that the intermediate acoustic impedance layer and the decorative layer and/or the upper acoustic impedance layer form a first reflective boundary. It is conceivable that the ratio between the acoustic impedances of the two (panel) layers forming the first reflective boundary is greater than 2:1, most preferably greater than 4:1. The greater the difference between acoustic impedances of the two materials at the first reflective boundary, the greater the reduction of transmitted sound. It is conceivable that the ratio between the acoustic impedances of the two materials at the boundary is more than 10:1.

It is also conceivable that the decorative top layer functions as an upper acoustic impedance layer. The upper acoustic impedance layer therefore can be understood as any part of the decorative top layer comprising at least 0.5 wt. %, preferably at least 5 wt. % of high-impedance materials, in particular in order to increase its impedance. It is also conceivable that the upper acoustic impedance layer makes part of a layer comprised in the decorative top layer.

The panel according to the present invention preferably comprises at least one core layer. The presence of a core layer could further contribute to the acoustic performance of the panel. It is beneficial to apply a core layer having a rigidity of at least 3500 MPa, in particular when measured according to EN310 or ASTM D790. Such core layer benefits from a high rigidity to provide sufficient support for the decorative top layer and the compressible layer and could allow for the provision of an interlocking mechanism. The core layer could further act as impedance layer.

A non-limiting example of a core layer which could be applied is a composite core layer comprising at least one mineral material and at least one binder. Preferably, the core layer is made of a relatively brittle material with high compressive strength. The core layer could for example comprise at least 60 wt. % mineral material, preferably at least 70 wt. % mineral material. A higher mineral content typically results in a more rigid core layer and thus a more rigid panel. Moreover, due to the relatively large quantity of mineral material a relatively good temperature resistance can be obtained, in particular with respect to conventional floor panel having a core which is predominantly PVC based. It is conceivable that at least one core layer comprises at least one mineral material selected from the group consisting of: magnesium oxide, calcium carbonate, chalk, clay, calcium silicate and/or talc. As a further non-limiting example, limestone (e.g. calcium carbonate with magnesium carbonate) may be used as mineral material in the core layer. Possibly, the mineral material is present as particulate mineral filler.

Preferably the core further comprises at least one strengthening additive selected from the group consisting of fibrous materials, fibre, such as but not limited to steel, glass, polypropylene, wood, acrylic, alumina, curaua, carbon, cellulose, coconut, kevlar, Nylon, perlon, polyethylene, PVA, rock wool, viburnum, fibreglass and/or fique. This can further increase the strength of the panel itself. It is possible that the core layer further comprises at least one natural material, such as wood fibers, mycelium, wool, straw, hemp and the like.

The core layer preferably has a density of at least 1200 kg/m³, preferably at least 1400 kg/m³. The density of the core layer could for example be in the range of 1600 to 2100 kg/m³. The core layer could for example act as an (high) acoustic impedance layer. The impedance of said core layer is preferably at least 4, preferably more than 7, most preferably more than 10 Mrayl. The addition of high-impedance materials such as copper, iron, alumina to at least part of the core layer may effectively increases its impedance. It is conceivable that any of the layers comprised in the core functions as a(n) (high) acoustic impedance layer. The acoustic impedance layer therefore can be understood as any part of the core layer comprising at least 0.5 wt. % preferably at least 5 wt. % of high-impedance materials to increase its impedance. At least part of the core layer may for example comprises at least 0.5% by weight of an additive with an acoustic impedance higher than 30 Mrayl, preferably at least 1% by weight, more preferably at least 2% by weight. It is also conceivable that at least part of the core layer comprises at most 15% by weight of an additive with an acoustic impedance higher than 30 Mrayl, preferably at most 10% by weight, more preferably at most 5% by weight. It is also conceivable that the (high) acoustic impedance layer makes part of a layer comprised in the core. The core layer can be designed such that the impedance of the core layer's material being key in further attenuating sound. Results up to 30 dB improved sound attenuation were observed when a core layer having a density in the range of 1600 to 2100 kg/m3 was applied. It is beneficial if the core layer having a density in said range also has an acoustic impedance of more than 7 MRayl in synergy with other characteristic features according to the present invention. This can be explained by such core layer being efficient at blocking out any remaining higher frequencies that are still being generated during the exciting of the top surface. It is conceivable that the core is at least partially foamed and features a density gradient. In a preferred embodiment, the density of the material of the core at its top and/or bottom surface is at least 5%, more preferably at least 20% higher than the rest of the core.

In a preferred embodiment, at least part of an upper and/or lower surface of the core layer comprises a plurality of cavities. The presence of cavities in the upper and/or lower surface of the core layer could further contribute to the sound diffusion, sound distribution and/or attenuation. The plurality of cavities could for example define a predetermined pattern, which may be a repeated cavity pattern. The upper and/or lower surface of the core layer preferably at least partially comprises a predetermined pattern of sound-diffusing cavities that scatter incoming and/or outgoing sound waves. Possibly, at least part of the cavities may differ in depth, shapes, sized and/or angles. It is conceivable that the sound-diffusing cavities feature different depths, shapes, sized and/or angles designed to scatter different frequencies of sound waves. At least part of the cavities may be impressed cavities. At least part of cavities may for example be obtained via imprinting, rotary imprinting and/or rotary (die) cutting. It is beneficial if the cavities are present in a central region of the panel. At least one outer edge and preferably all outer edges of the core layer may be free of cavities. Hence, it is conceivable that the cavity or cavities do not extend through the outer edge(s) of the panel. It is for example conceivable that at least 1 cm from each outer edge of the panel is free of cavities. It is for example also possible that the circumferential edge of the panel, and in particular the core layer, is over of at least 2 centimetre free of cavities.

In case a core layer is applied which comprises a plurality of cavities, in the upper surface and/or in the lower surface of the core layer, the density is only determined by the actual material of the core layer wherein the cavities are not taken into account. Hence, the material of the core layer preferably has a density of at least 1200 kg/m³, preferably at least 1400 kg/m³. The density of the material of the core layer could for example be in the range of 1600 to 2100 kg/m3.

The core layer may have an acoustic impedance of at least 4, preferably at least 7 and more preferably at least 10 Mrayl. It is also conceivable that the core layer comprises at least one further impedance layer which has an impedance of at least 4, preferably at least 7 and more preferably at least 10 Mrayl.

In one preferred embodiment, the compressible layer and at least one acoustic impedance layer incorporated in the core layer form a second impedance boundary in the structure of the floor panel. The ratio between the acoustic impedances of the two materials at the boundary is therefore preferably greater than 2:1, most preferably greater than 4:1. The greater the difference between acoustic impedances of the two materials at the boundary, the greater the reduction of transmitted sound. It is conceivable that the ratio between the acoustic impedances of the two materials at the boundary is more than 10:1.

Typically, the core layer has a thickness in the range of 2 to 8 mm, preferably in the range of 3 to 5 mm. A further non-limiting example is a core layer in the range of 3.5 and 4.5 mm. In a further preferred embodiment, the panel, and in particular the core layer comprises at least one pair of opposite side edges which are provided with interconnecting coupling parts for interconnecting adjacent panels. The panel according to the present invention may comprise at least one pair of opposing (side) edges, said pair of opposing (side) edges comprising complementary coupling parts configured for mutual coupling of adjacent panels. The coupling parts of the panel may for example be interlocking coupling parts, which are preferably configured for providing both horizontal and vertical locking. Interlocking coupling parts are coupling parts that require elastic deformation, a click or a movement in multiple directions to couple or decouple the parts with or from each other. Any suitable interlocking coupling parts as known in the art could be applied. A non-limiting example is an embodiment wherein a first edge of said first pair of opposing edges comprises a first coupling part, and wherein a second edge of said first pair of opposing edges comprises a complementary second coupling part, said coupling parts allowing a plurality of panels to be mutually coupled; wherein the first coupling part comprises a sideward tongue extending in a direction substantially parallel to a plane defined by the panel, and wherein the second coupling part comprises a groove configured for accommodating at least a part of the sideward tongue of another panel, said groove being defined by an upper lip and a lower lip.

In a preferred embodiment the panel comprises at least one backing layer attached to a rear side of the core layer. The backing layer might be also called a cushioning layer or damping layer. The backing layer is typically made of a polymer material, for example but not limited to a low density foamed layer, of ethylene-vinyl acetate (EVA), irradiation-crosslinked polyethylene (IXPE), expanded polypropylene (XPP) and/or expanded polystyrene (XPS). However, it is also conceivable that the backing layer comprises nonwoven fibers such as natural fibers like hemp or cork, and/or recycled/recyclable material such as PET, felt, recycled carpet and the like and/or combinations thereof.

In a preferred embodiment, at least one backing layer comprises at least one compressible natural material. It is for example conceivable that the at least one compressible natural material of the backing layer is chosen from the group of: felt, cotton, wool, mycelium, hemp, cork and/or combinations thereof. The backing layer can also be made of the same material as the compressible layer. The backing layer may for example have a thickness in the range of 0.8 to 2 mm, preferably in the range of 1.25 mm to 1.75 mm, for example substantially 1.5 mm. Preferably, the thickness of the compressible layer is smaller than the thickness of the backing layer. However, it is also conceivable that the thickness of the compressible layers equals the thickness of the backing layer, if applied.

The cushioning or backing layer attributes a sound dampening effect to the panel. A backing layer is further helpful in providing an optimum interface between the panel and the underlying surface on which the panels are applied and may provide a protective function for the core layer. It also allows to absorb some subfloor irregularities.

The backing layer preferably has a density in the range of 65 kg/m3 and 300 kg/m$^3$, more preferably in the range of 80 kg/m3 and 150 kg/m$^3$. The thickness of the backing layer typically varies from about 0.1 to 2.5 mm. Non-limiting examples of materials whereof the backing layer can be made of are polyethylene, cork, polyurethane and ethylene-vinyl acetate.

In one embodiment, it is also conceivable that the panel comprises (at its back surface) at least one balancing layer, generally composed of at least one layer comprising lignocellulose and a cured resin, a wood or bamboo veneer, and the like.

The invention also relates to a decorative top layer for use in a panel according to the present invention. The invention further relates to a compressible layer for use in a panel according to the present invention. The decorative top layer and/or the compressible layer can be any of the described embodiments. The invention also relates to an assembly of at least one decorative top layer and at least one compressible layer for use in a panel according to the present invention.

The invention will be further elucidated by means of non-limiting exemplary embodiments illustrated in the following figures, in which:

FIG. 1b shows a cross section of the panel as shown in FIG. 1a;

Within these figures, similar reference numbers correspond to similar or equivalent elements or features.

Figure 1A:
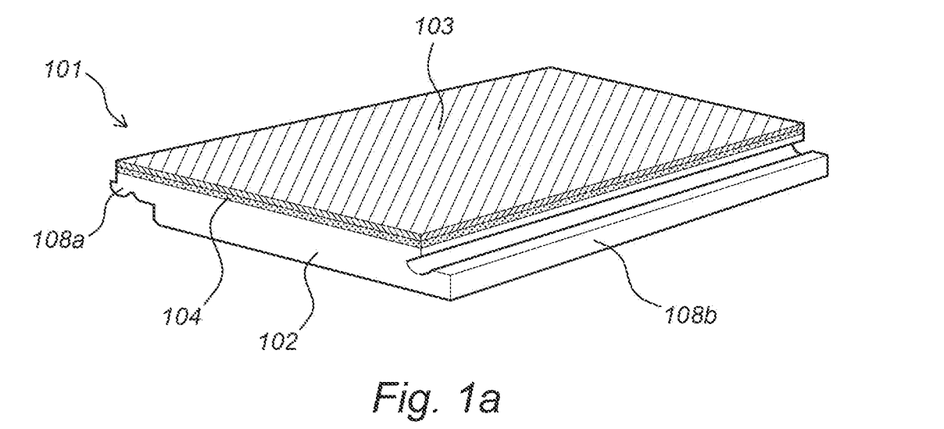
FIG. 1a shows a perspective view of a first embodiment of a flooring panel according to the present invention.
Figure 1B:
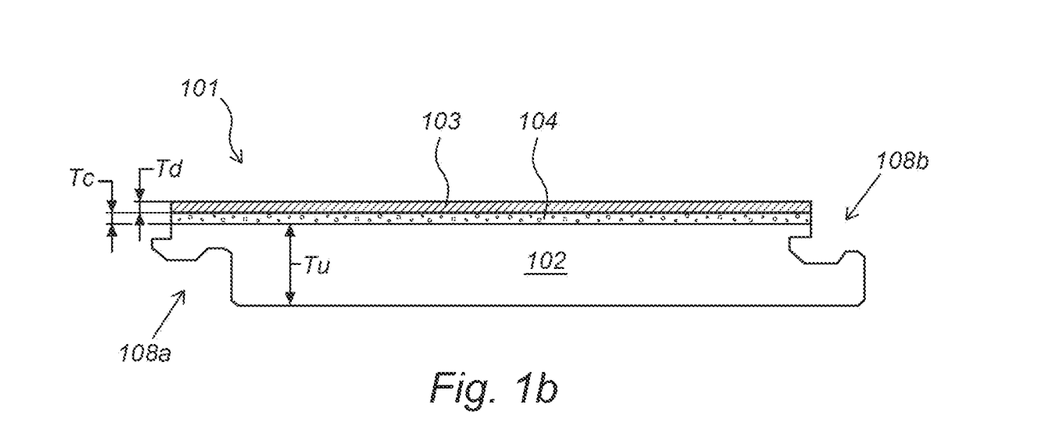

FIG. 1a shows a perspective view of a first embodiment of a flooring panel 101 according to the present invention. FIG. 1b shows a cross section of the panel 101 as shown in FIG. 1a. The panel 101 comprises a core layer 102, a decorative top layer 103 and a compressible layer 104. The compressible layer 104 is situated between the core layer 102 and the decorative top layer 103. The compressible layer 104 comprises a compressible natural material, in particular cork. The decorative top layer 103 comprises a veneer, in particular wood veneer. In the shown embodiment, the thickness Td of the decorative top layer 103 substantially equals the thickness Tc of the compressible layer 104. The thickness Tu of the core layer is in the shown, non-limiting embodiment, substantially larger than the thicknesses Td, Tc of the decorative top layer 103 and the compressible layer 104. The core layer 102 comprises two pairs of opposite side edges. In the shown embodiment, a first pair of opposite side edges is provided with interconnecting coupling parts 108a, 108b for interconnecting adjacent panels 101.

Figure 2:
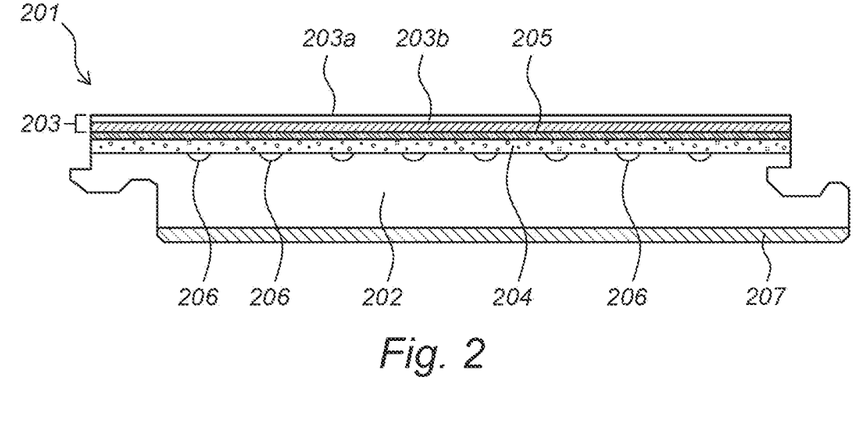
FIG. 2 shows a cross section of a second embodiment of a flooring panel according to the present invention.

FIG. 2 shows a cross section of a second possible embodiment of a flooring panel 201 according to the present invention. The panel 201 comprises a core layer 202, a decorative top layer 203 and a compressible layer 204. The decorative top layer 203 comprises a décor layer 203b in the form of a veneer layer 203b and a wear layer 203a. The panel 201 further comprises a reinforcing layer 205 positioned between the decorative top layer 203 and the compressible layer 204. In the shown embodiment, an upper surface of the core layer 202 comprises a plurality of cavities 206 which are present in a predetermined pattern configured to scatter incoming sound waves. The panel 201 could optionally comprise a backing layer 207.

Figure 3:
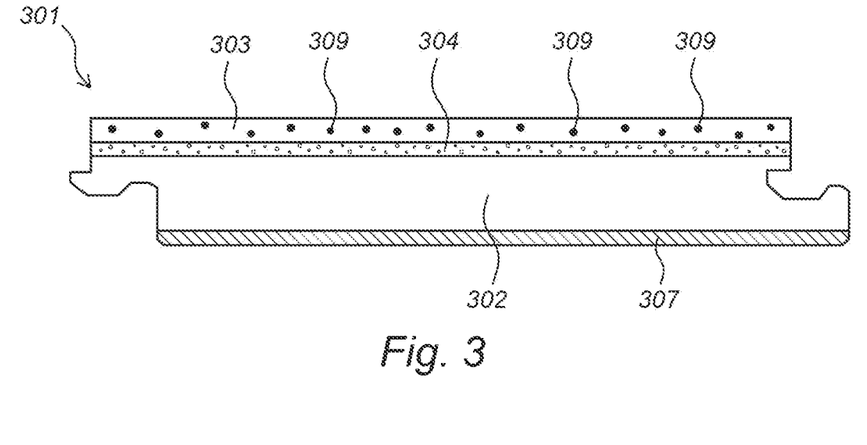
FIG. 3 shows a cross section of a third possible embodiment of a flooring panel according to the present invention.

FIG. 3 shows a cross section of a third possible embodiment of a flooring panel 301 according to the present invention. The panel 301 comprises a core layer 302, a decorative top layer 303 and a compressible layer 304. The panel 301 further comprises backing layer 307. The backing layer 307 may comprise a compressible natural material. The thickness of the backing layer 307 substantially equals the thickness of the compressible layer 304. The decorative top layer 303 comprises an additive 309, preferably comprising iron, silicon carbide and/or alumina. Said additives 309 are embedded in at least part of the decorative top layer 303.

Figure 4:
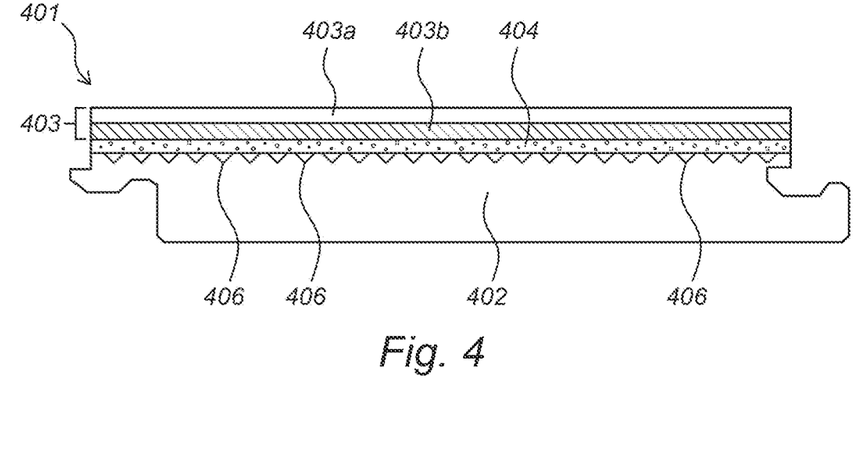
FIG. 4 shows a cross section of a fourth possible embodiment of a flooring panel according to the present invention.

FIG. 4 shows a cross section of a fourth possible embodiment of a flooring panel 401 according to the present invention. The panel 401 comprises a core layer 402, a decorative top layer 403 and a compressible layer 404. The upper surface of the core layer 402 comprises a plurality of cavities 406 which are present in a predetermined pattern configured to scatter incoming sound waves. The decorative top layer 403 comprises a veneer layer 403a and an upper acoustic impedance layer 403b.

Figure 5:
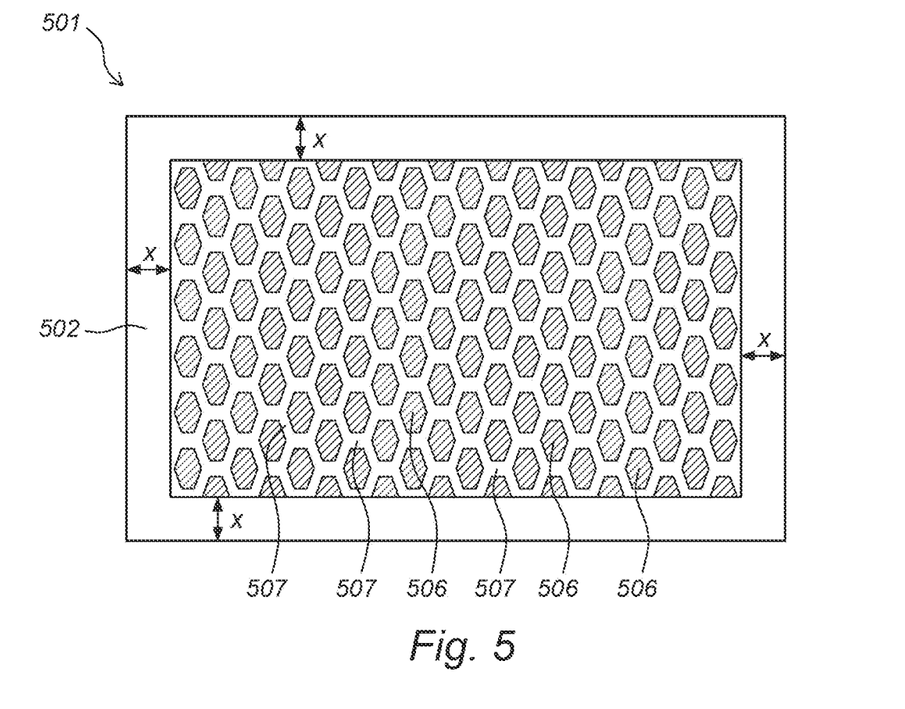
FIG. 5 shows a a schematic representations of possible embodiment of a core layer for use in a panel according to the present invention.

FIG. 5 shows a schematic representations of possible embodiment of a panel 501 according to the present invention, and in particular a core layer 502 thereof. The figure shows a top view of the core layer 502. The panel comprises a core layer 502, preferably comprising a composite material comprising a mixture of mineral material and thermoplastic material. The core layer 502 has an upper surface (shown) and a bottom surface which is not shown in the picture. However, the bottom surface may equal the top surface, and may hence also be provided with a plurality of cavities too. Part of the upper surface of the core layer 502 is provided with a plurality of cavities 506. The cavities 506 extends towards the bottom surface of the core layer 502. The cavities 506 are integrally formed cavities 506. In the shown embodiment, the cavities 506 define a cell pattern, in particular a polygon cell pattern. The figure show that the cavities 506 are separated via partitions 507, wherein at least part of the partitions 507 between the cavities 506 have a thickness which is smaller than the length and/or width of the cavities 506. In the shown embodiment, the cavities 506 are imprinted into the upper surface of the core layer 502. Hence, the cavities 506 are imprinted cavities 506. The edges of the core layer 502 are substantially free of cavities. The circumferential edge of the panel is over a predetermined distance X free of cavities 506. The core layer 502 as shown is preferably used in combination with a decorative top layer and a compressible layer according to the present invention.

Figure 6:
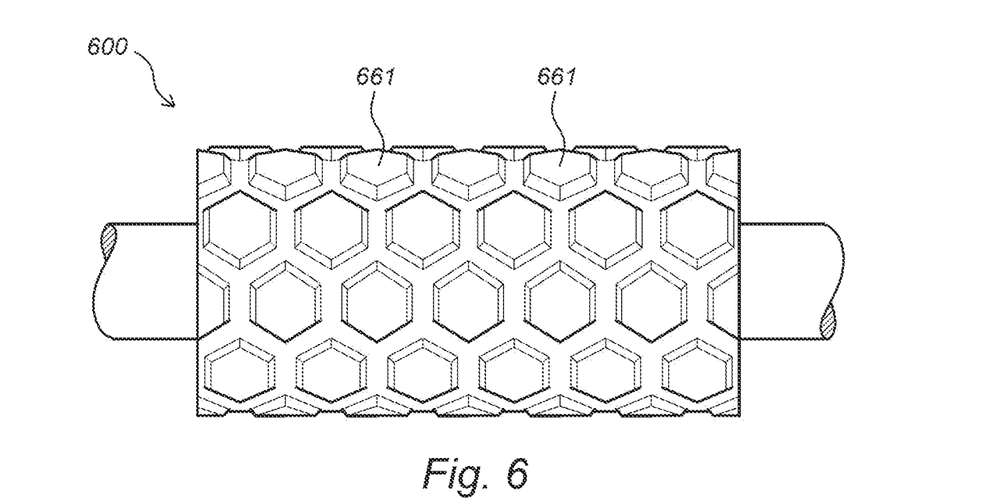
FIG. 6 shows a roller which could be applied to manufacture a core layer for use in a panel according to the present invention.

FIG. 6 shows a roller 600 which could be applied to manufacture a core layer for use in a panel according to the present invention. The plurality of cavities can be provided by subjecting at least part of the upper surface and/or the bottom surface of a core layer to a (rotary) imprinting process. This can for example be done substantially directly after extrusion of the core layer. It is for example conceivable that the core layer is led trough at least two rollers 600, wherein at least one of the rollers is provided with a surface structure 661 configured to provide a plurality of cavities in at least part of the bottom surface of the core layer.

Figure 7:
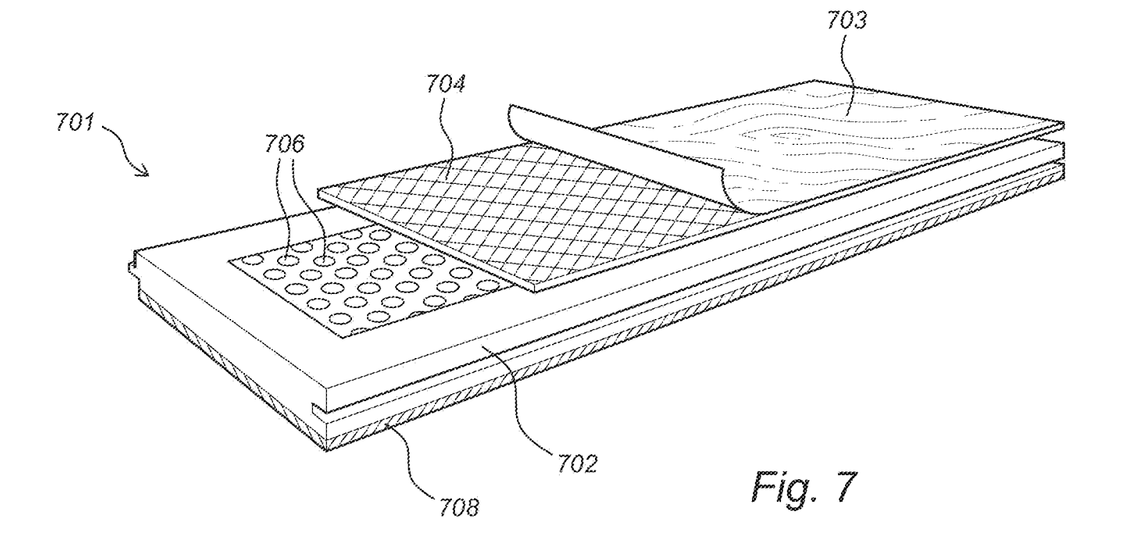
FIG. 7 shows a perspective view of a further possible embodiment of a flooring panel according to the present invention.

FIG. 7 shows a perspective view of a further possible embodiment of a flooring panel 701 according to the present invention. The panel 701 comprises a core layer 702, a decorative top layer 703 and a compressible layer 704. Part of the upper surface of the core layer 702 comprises a plurality of cavities 706 which are present in a predetermined pattern configured to scatter incoming sound waves. The panel 701 further comprises a backing layer 708.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. A hard surface flooring panel suitable for constructing a floor covering, comprising:
    at least one core layer;
    at least one decorative top layer; and
    at least one compressible layer situated between the at least one core layer and the at least one decorative top layer, wherein the at least one compressible layer has a thickness in the range of 0.8 mm to 2 mm;
wherein the at least one decorative top layer comprises at least one veneer and wherein the at least one compressible layer is at least one compressible natural material;
    wherein the at least one compressible natural material is cork,
    and wherein the at least one veneer comprises a wood veneer having a thickness in the range of 0.1 mm to 2 mm.

2. The panel according to claim 1, wherein the at least one compressible natural material comprises a second compressible natural material chosen from the group consisting of felt, cotton, wool, mycelium, hemp and combinations thereof.

3. The panel according to claim 1, wherein the at least one decorative top layer comprises a second veneer chosen from the group consisting of a wood veneer, a bamboo veneer, a tile veneer, a stone veneer and a clay veneer.

4. The panel according to claim 1, wherein the at least one compressible layer has a Shore A hardness of 55 or less.

5. The panel according to claim 1, wherein an upper surface of the at least one decorative top layer has a Shore D hardness of at least 46.

6. The panel according to claim 1, wherein the at least one veneer has a thickness in the range of 0.8 mm to 2 mm, and wherein the thickness of the at least one decorative top layer is equal to or larger than the thickness of the at least one compressible layer.

7. The panel according to claim 1, wherein the at least one compressible layer comprises at least one intermediate acoustic impedance layer having an acoustic impedance of at most 8 MRayl.

8. The panel according to claim 1, wherein the at least one decorative top layer has a flexibility in the range of 300 to 900 MPa.

9. The panel according to claim 1, wherein the at least one decorative top layer has a thickness in the range of 0.1 mm to 2 mm.

10. The panel according to claim 1, wherein the at least one core layer is a composite core layer comprising at least 60 wt. % of at least one mineral material and comprising at least one binder.

11. The panel according to claim 1, wherein at least part of an upper surface of the at least one core layer and/or at least part of a lower surface of the at leaast one core layer comprises a plurality of impressed cavities defining a predetermined pattern.

12. The panel according to claim 11, wherein at least part of the plurality of impressed cavities differ in depth, size, angle and/or shape.

13. The panel according to claim 1, wherein the at least one core layer has a thickness in the range of 3 mm to 7 mm.

14. The panel according to claim 1, further comprising at least one backing layer attached to a rear side of the at least one core layer, wherein the at least one backing layer comprises at least one compressible natural material selected from the group consisting of felt, cotton, wool, mycelium, hemp, cork and combinations thereof.

15. The panel according to claim 14, wherein the at least one backing layer has a thickness in the range of 0.8 to 2 mm.

16. The panel according to claim 14, wherein the at least one compressible layer is made of the same material as the at least one backing layer.

17. The panel according to claim 14, wherein the thickness of the at least one compressible layer is smaller than the thickness of the at least one backing layer.

18. The panel according to claim 1, further comprising at least one backing layer attached to a rear side of the at least one core layer, wherein the at least one backing layer comprises a polymer material comprising a low density foamed layer, of ethylene-vinyl acetate (EVA), irradiation-crosslinked polyethylene (IXPE), expanded polypropylene (XPP) and/or expanded polystyrene (XPS).

19. The panel according to claim 1, wherein the at least one core layer comprises at least one pair of opposite side edges which are provided with interconnecting coupling parts for interconnecting adjacent panels.

20. The panel according to claim 1, wherein the at least one compressible layer has a thickness in the range of 0.75 to 1.25 mm in an uncompressed state.

* * * * *